US011105471B2

(12) United States Patent
Taguchi et al.

(10) Patent No.: US 11,105,471 B2
(45) Date of Patent: Aug. 31, 2021

(54) AIRCRAFT WATER TANK

(71) Applicant: The Yokohama Rubber Co., LTD., Tokyo (JP)

(72) Inventors: Yuji Taguchi, Hiratsuka (JP); Takahiro Ozawa, Hiratsuka (JP); Hayato Kato, Hiratsuka (JP)

(73) Assignee: The Yokohama Rubber Co., LTD.

( * ) Notice: Subject to any disclaimer, the term of this patent is extended or adjusted under 35 U.S.C. 154(b) by 57 days.

(21) Appl. No.: 15/578,160

(22) PCT Filed: May 12, 2016

(86) PCT No.: PCT/JP2016/064114
§ 371 (c)(1),
(2) Date: Nov. 29, 2017

(87) PCT Pub. No.: WO2016/194574
PCT Pub. Date: Dec. 8, 2016

(65) Prior Publication Data
US 2018/0142839 A1    May 24, 2018

(30) Foreign Application Priority Data

Jun. 2, 2015  (JP) .............................. JP2015-112053

(51) Int. Cl.
| F17C 13/06 | (2006.01) |
| F16J 15/06 | (2006.01) |
| F16J 12/00 | (2006.01) |
| B65D 90/04 | (2006.01) |
| B65D 90/08 | (2006.01) |
| F17C 3/00 | (2006.01) |
| B65D 88/14 | (2006.01) |

(52) U.S. Cl.
CPC .............. *F17C 13/06* (2013.01); *B65D 88/14* (2013.01); *B65D 90/04* (2013.01); *B65D 90/08* (2013.01);
(Continued)

(58) Field of Classification Search
CPC . B65D 1/16; B65D 1/48; B65D 25/14; B65D 85/72; B65D 90/041; F17C 1/00;
(Continued)

(56) References Cited

U.S. PATENT DOCUMENTS

| 5,938,209 A * | 8/1999 | Sirosh ...................... F17C 13/06 220/495.08 |
| 2008/0251520 A1 * | 10/2008 | Ota ........................... F17C 1/16 220/586 |

(Continued)

FOREIGN PATENT DOCUMENTS

| DE | 2 152 123 | 5/1973 |
| FR | 2 193 953 | 2/1974 |

(Continued)

OTHER PUBLICATIONS

International Search Report for International Application No. PCT/JP2016/064114 dated Jun. 7, 2016, 4 pages, Japan.

*Primary Examiner* — Anthony D Stashick
*Assistant Examiner* — Raven Collins
(74) *Attorney, Agent, or Firm* — Thorpe North & Western

(57) ABSTRACT

Provided is an aircraft water tank with a lid joined to an opening portion via internal threads and external threads. An O-ring is compressed so that the opening portion is liquid-tightly sealed, which forms a sealed water storage space in a tank body. The portion of the lid that compresses the O-ring is a corner portion formed by an end surface of an annular plate portion and an outer peripheral surface of a tube portion. The portion of an inner liner that compresses the O-ring is a portion of the inner liner attached to an inclined surface. An end portion of the inner liner attached to the surface of a bulging portion is located outside the water storage space.

6 Claims, 2 Drawing Sheets

(52) U.S. Cl.
CPC ............... *F16J 12/00* (2013.01); *F16J 15/06* (2013.01); *F17C 3/00* (2013.01); *F17C 2201/0109* (2013.01); *F17C 2205/0305* (2013.01); *F17C 2205/0311* (2013.01); *F17C 2270/0189* (2013.01)

(58) Field of Classification Search
CPC ............... F17C 1/16; F17C 2203/0604; F17C 2203/0658–0675; F16J 12/00
USPC .................................................. 220/586, 661
See application file for complete search history.

(56) References Cited

U.S. PATENT DOCUMENTS

| | | | | |
|---|---|---|---|---|
| 2010/0258573 | A1* | 10/2010 | Weber | F17C 1/06 220/586 |
| 2011/0210516 | A1* | 9/2011 | Sharp | F17C 1/16 277/312 |
| 2011/0220660 | A1* | 9/2011 | Strack | F17C 1/06 220/586 |
| 2011/0303681 | A1* | 12/2011 | Newhouse | F17C 1/06 220/581 |
| 2013/0049256 | A1* | 2/2013 | Tani | B29C 49/20 264/249 |
| 2016/0123532 | A1* | 5/2016 | Nakamura | F17C 1/16 220/586 |
| 2016/0257403 | A1 | 9/2016 | Masuda | |

FOREIGN PATENT DOCUMENTS

| | | |
|---|---|---|
| FR | 2 301 746 | 9/1976 |
| JP | 2011-251736 | 12/2011 |
| JP | 2014-019497 | 2/2014 |
| JP | 2015-085946 | 5/2015 |
| WO | WO 2015/064424 | 5/2015 |

* cited by examiner

AIRCRAFT WATER TANK

TECHNICAL FIELD

The present technology relates to an aircraft water tank.

BACKGROUND ART

In the related art, an aircraft water tank has a tank body composed of an inner liner and a fiber-reinforced resin layer covering the inner liner, and the tank body has a cylindrical portion and dome portions provided on both sides of the cylindrical portion.

Such an aircraft water tank has opening portions for cleaning the interior of the tank body which are provided through the centers of both the dome portions. Each of the opening portions is composed of a mouthpiece attached to the center of the dome portion and a lid detachably joined to the mouthpiece via an O-ring.

The mouthpiece has a tubular portion on which internal threads are formed, the internal threads being engaged with external threads of the lid; and a skirt portion extending outward from the end of the tubular portion in the radial direction of the tubular portion. The inner liner is attached to the inner peripheral surface of the skirt portion with an adhesive, and the fiber-reinforced resin layer is attached to the outer peripheral surface of the skirt portion.

The end of the inner liner is located closer to the interior of the tank body than the O-ring on the inner peripheral surface of the skirt portion. When the aircraft water tank is in use, the inner peripheral surface of the skirt portion including the end of the inner liner comes into contact with drinking water.

In the related art, in order to prevent direct contact between the water and the adhesive for attaching the inner liner to the skirt portion while an aircraft water tank is in use, a coating process for applying an FDA (Food and Drug Administration) approved material to the surface of the skirt portion around the end of the inner liner is required. Therefore, the coating process is added to the manufacturing process of the aircraft water tank, and this coating has to be inspected and repaired at the time of maintenance.

SUMMARY

Some improvements have been desired for increasing the production efficiency, reducing costs, and increasing the efficiency of the maintenance work.

The present technology provides an aircraft water tank advantageous in increasing the production efficiency, reducing costs, and increasing the efficiency of maintenance work.

The present technology provides an aircraft water tank including:

a tank body having an inner surface formed of an inner liner; an annular mouthpiece attached to the tank body; an opening portion provided inside the mouthpiece; and a lid detachably joined to the mouthpiece. In such an aircraft water tank, the opening portion is opened and sealed by the lid, the mouthpiece has a tubular portion to which the lid is joined, the tubular portion has a bulging portion provided on an inner peripheral portion of the tubular portion, the bulging portion bulging inward in a radial direction of the tubular portion, the inner liner is attached to a surface of the bulging portion, a seal member is provided between a portion of the lid located inside the tubular portion and a portion of the inner liner attached to the surface of the bulging portion, in a state where the lid is joined to the tubular portion, compression of the seal member seals the opening portion liquid-tightly to form a sealed water storage space inside the tank body, and an end of the inner liner attached to the surface of the bulging portion is located outside the water storage space.

According to the present technology, when the aircraft water tank is in use, the drinking water stored in the tank body does not come into contact with the end of the inner liner.

This eliminates the need of the coating process, using an FDA-approved material, for preventing water from directly coming into contact with the adhesive that is used to attach the inner liner to the skirt portion. Therefore, a drastic reduction in time required for applying an FDA-approved material at the time of manufacturing, maintenance, and inspection is advantageous in increasing the production efficiency of the aircraft water tank, reducing costs, and increasing the efficiency of maintenance work.

DETAILED DESCRIPTION

First Embodiment

Embodiments of the present technology will be described with reference to the drawings.

Figure 1:
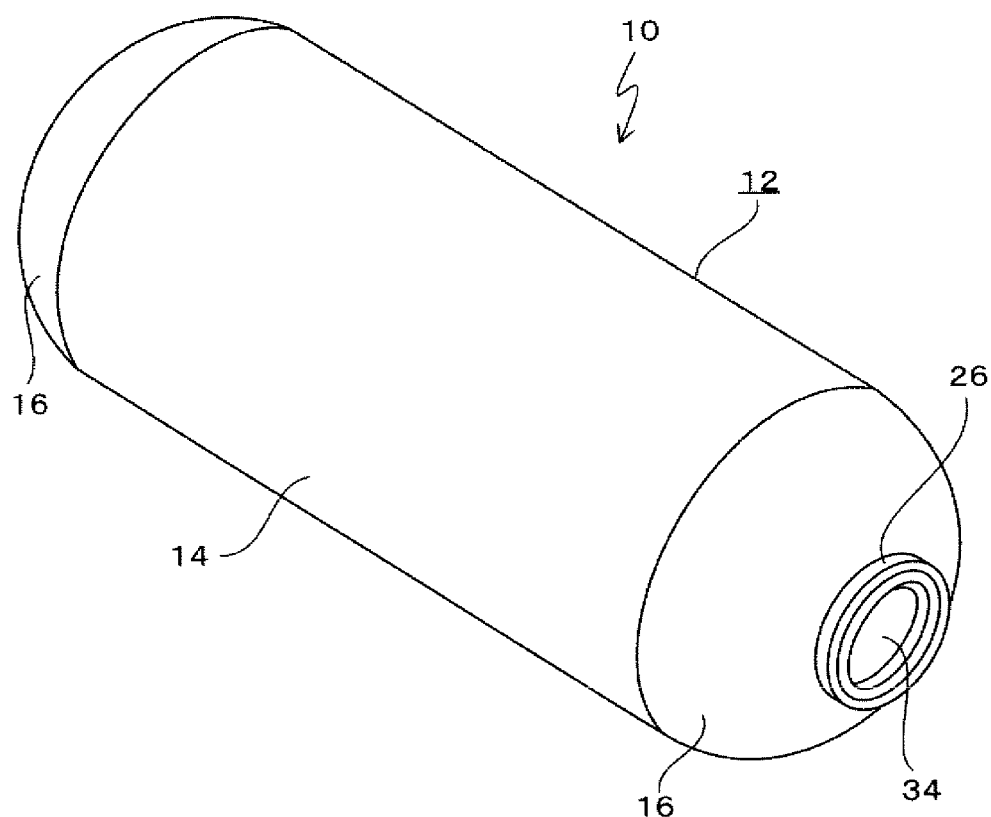
FIG. 1 is a perspective view of an aircraft water tank.

As illustrated in FIG. 1, an aircraft water tank 10 installed in an aircraft and containing drinking water has a tank body 12, the interior of which serves as a water storage space.

The tank body 12 has a cylindrical portion 14 and dome portions 16 provided on both sides of the cylindrical portion 14.

Figure 2:
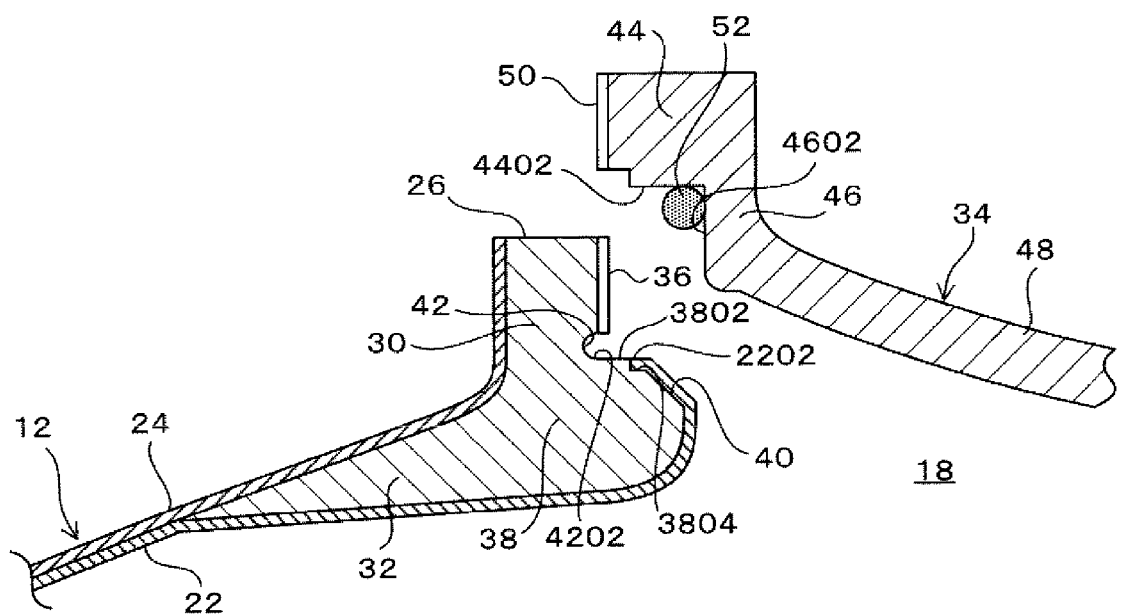
FIG. 2 is an enlarged view of main portions of a mouthpiece and a lid in a state where the mouthpiece and the lid are separated from each other.
Figure 3:
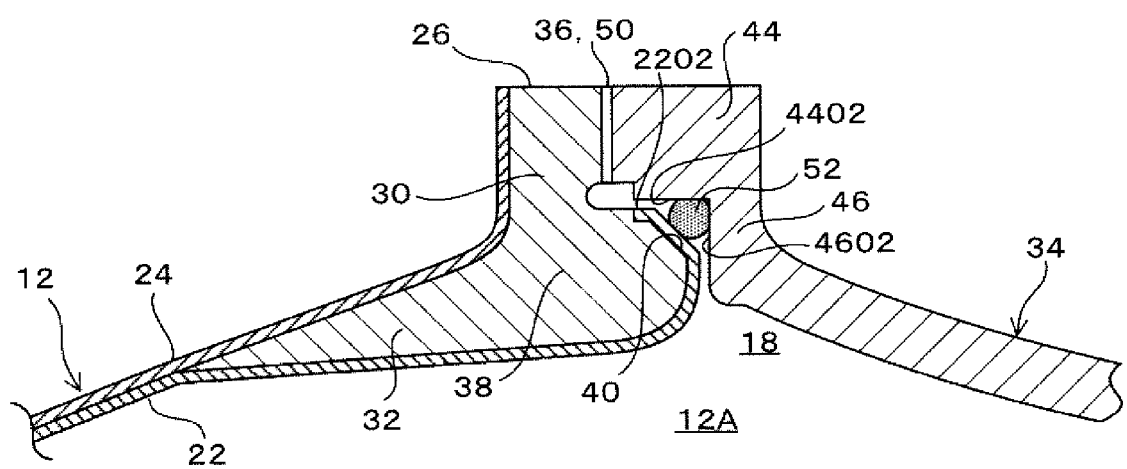
FIG. 3 is an enlarged view of the main portions of the mouthpiece and the lid in a state in which the mouthpiece and the lid are joined.

As illustrated in FIG. 2, opening portions 18 for cleaning the interior of the tank body 12 are provided through the centers of both the dome portions 16, and each of the opening portions 18 is opened and sealed by a lid 34.

A piping nozzle (not illustrated) for supplying water to various places of the aircraft is provided on the upper portion of the cylindrical portion 14, and a piping nozzle (not illustrated) for discharging water is provided on the lower portion of the cylindrical portion 14.

As illustrated in FIG. 2, the tank body 12 includes an inner liner 22 serving as the inner surface of the aircraft water tank 10 and a fiber-reinforced resin layer 24 covering the outer surface of the inner liner 22.

The inner liner 22 is a hollow body defining the contour of the aircraft water tank 10 and is manufactured by blow molding. The blow molding involves melting a synthetic resin into a pipe shape, clamping the pipe-shaped resin into a mold, and feeding air into the pipe-shaped resin to obtain a molded product.

For the inner liner 22, various known materials in the related art approved by the FDA are available. Examples of such materials include polyolefin resins such as polypropylene and polyethylene which are thermoplastic resins.

The fiber-reinforced resin layer 24 is formed by filament winding in which reinforcing fibers (filaments) impregnated with a thermosetting resin are wound around the outer peripheral surface of the inner liner 22.

Various known synthetic resins in the related art such as an epoxy resin are available for the thermosetting resin. Various known fibers in the related art such as carbon fibers or glass fibers are available for the reinforcing fibers.

Each of the opening portions 18 is formed by an annular mouthpiece 26 attached between both ends of the inner liner 22 and both ends of the fiber-reinforced resin layer 24. When the aircraft water tank 10 is in use, the opening portion 18 is sealed by the lid 34.

The mouthpiece 26 has a tubular portion 30 disposed at the center of the dome portion 16 and a skirt portion 32 extending outward from the end portion of the tubular portion 30 in the radial direction of the tubular portion 30.

Internal threads 36 are provided at a position on an inner peripheral portion of the tubular portion 30, which is remote from the tank body 12 in the axial direction of the tubular portion 30. The internal threads 36 serve as a joint portion of the mouthpiece to which the lid 34 is joined.

A bulging portion 38 is provided at a position on an inner peripheral portion of the tubular portion 30, which is adjacent to the tank body 12 in the axial direction of the tubular portion 30.

The bulging portion 38 bulges inward in the radial direction from the minor diameter of the internal threads 36 and has a curved surface protruding inward in the radial direction. The end of the bulging portion 38 adjacent to the internal threads 36 is a flat surface 3802 extending orthogonal to the axial direction of the internal threads 36.

An inclined surface 40 is formed at a position on an inner peripheral portion of the bulging portion 38 adjacent to the internal threads 36. The inclined surface 40 is inwardly inclined in the radial direction of the tubular portion 30 toward the tank body 12 in the axial direction of the tubular portion 30.

A groove 42 having an inner peripheral surface whose diameter is larger than the major diameter of the internal threads 36 is formed at the boundary between the internal threads 36 and the bulging portion 38 on the inner peripheral portion of the tubular portion 30.

Of a pair of side surfaces which serve as part of the groove 42 and face each other, a side surface 4202 adjacent to the bulging portion 38 is flush with the flat surface 3802 on the end of the bulging portion 38 and extends on a plane orthogonal to the axis of the internal threads 36.

Further, the inner peripheral portion of the flat surface 3802 serves as a flat surface 3804 which is displaced in a direction away from the internal threads 36 by the thickness of the inner liner 22, and the flat surface 3804 is connected to the inclined surface 40.

The internal threads 36, the bulging portion 38, and the groove 42 are formed coaxially.

As the distance from the bulging portion 38 increases, the inner diameter of the skirt portion 32 gradually increases and the thickness of the skirt portion 32 gradually decreases.

The inner peripheral surface of the skirt portion 32 and the surface of the bulging portion 38 adjacent to the skirt portion 32 are formed in a continuous shape. That is, the surface of the half of the bulging portion 38 remote from the internal threads 36 in the axial direction of the tubular portion 30 is a curved surface whose inner diameter increases as the distance from the internal threads 36 increases, and this curved surface is continuous with the inner peripheral surface of the skirt portion 32, which allows the inner liner 22 (described below) to be smoothly attached to both the inner peripheral surface of the skirt portion 32 and the surface of the bulging portion 38.

The fiber-reinforced resin layer 24 is attached to the outer peripheral surface of the skirt portion 32.

The inner liner 22 is attached to both the inner peripheral surface of the skirt portion 32 and the surface of the bulging portion 38. An end portion 2202 of the inner liner 22 is located on the flat surface 3804 beyond the inclined surface 40. The surface of the end portion 2202 is flush with the flat surface 3802.

The flat surface 3802 of the bulging portion 38 is located adjacent to the internal threads 36 in the axial direction of the tubular portion 30 and is directed to the space inside the internal threads 36.

The end portion 2202 of the inner liner 22 is located, on the flat surface 3802, inside the minor diameter of the internal threads 36 in the radial direction. This configuration allows visual observation inside the internal threads 36, of whether the end portion 2202 of the inner liner 22 is securely attached to the bulging portion 38 to be easily performed, which increases the production efficiency.

The lid 34 includes an annular plate portion 44, a tube portion 46 protruding from the inner peripheral portion of one end surface in the thickness direction of the annular plate portion 44, and an end surface portion 48 connecting a tip of the tubular portion 46.

External threads 50 are formed as a joining portion of the lid configured to be joined to a joining portion of the mouthpiece on the outer peripheral portion of the annular plate portion 44, and the external threads 50 are engageable with the internal threads 36.

Further, in the present embodiment, an O-ring 52 is mounted, as a seal member, at a position on the outer peripheral surface of the tubular portion 46 adjacent to the end face. The O-ring 52 mounted to the lid 34 allows the opening and sealing of the opening portion 18 using the lid 34 to be easily performed.

In the present embodiment, the mouthpiece 26 and the lid 34 are formed of the same synthetic resin material approved by the FDA, so that the external threads 50 and the internal threads 36 can be joined smoothly.

In a state where the lid 34 is joined to the opening portion 18 via the internal threads 36 and the external threads 50, compression of the O-ring 52 between a portion of the lid 34 extending beyond the internal threads 36 toward the interior of the tank body 12 and a portion of the inner liner 22 attached to the surface of the bulging portion 38 seals the opening portion 18 liquid-tightly to form a sealed water storage space 12A in the tank body 12.

In the present embodiment, the portion of the lid 34 configured to compress the O-ring 52 is a corner portion formed by the end surface 4402 of the annular plate portion 44 and the outer peripheral surface 4602 of the tubular portion 46, and the portion of the inner liner 22 configured to compress the O-ring 52 is a portion of the inner liner 22 attached to the inclined surface 40.

The end portion 2202 of the inner liner 22 attached to the surface of the bulging portion 38 is located at a position on the surface of the bulging portion 38 that is farther from the water storage space 12A than the portion where the O ring 52 is compressed.

According to the present embodiment, in a state where with the opening portion 18 is sealed by the lid 34, the inner peripheral surface of the skirt portion 32 of the mouthpiece 26 located in the drinking water and the surface of the bulging portion 38 are covered with the inner liner 22, and the end portion 2202 of the inner liner 22 is located on the surface of the bulging portion 38 that is farther from the water storage space 12A than the O-ring 52 that seals the interior of the tank body 12 liquid-tightly. That is, the end portion 2202 of the inner liner 22 is located outside the water storage space 12A.

This configuration prevents the water in the tank body 12 from coming into contact with the end portion 2202 of the inner liner 22 when the aircraft water tank 10 is in use.

Therefore, this configuration eliminates the need of the coating process using an FDA-approved material for preventing water leakage on the surface of the skirt portion 32 around the end portion 2202 of the inner liner 22, which is advantageous in increasing the production efficiency of the aircraft water tank 10 and reducing costs. In addition, at the time of maintenance, this configuration eliminates the need of inspections of and repairs on the coating for preventing water leakage formed of an FDA-approved material, which is advantageous in increasing the efficiency of the maintenance work.

Further, the end portion 2202 of the inner liner 22 is located at a position farther away from the water storage space 12A than a position where the O-ring 52 is compressed, in other words, the end portion 2202 of the inner liner 22 is positioned outside the water storage space 12A, which eliminates the possibility of separation of the inner liner 22 due to the pressure of the drinking water. Thus, even if the inner liner 22 is separated, it is advantageous in eliminating the risk of entering and leaking of water from the position where the inner liner 22 is separated.

When the aircraft water tank 10 is in use, the inner peripheral surface of the skirt portion 32 of the mouthpiece 26 located in the drinking water and the surface of the bulging portion 38 are covered with the inner liner 22, which prevents the mouthpiece 26 from directly coming into contact with the drinking water.

Therefore, in manufacturing the mouth piece 26, materials used are not limited to FDA approved materials, and any desired materials having various properties can be used, which is advantageous in expanding the degree of freedom of design.

Further, in the present embodiment, at the boundary between the internal threads 36 and the bulging portion 38 on the inner peripheral portion of the tubular portion 30, the groove 42 having an inner peripheral surface whose diameter is larger than the major diameter of the internal threads 36 are formed.

Therefore, the operation of attaching the inner liner 22 to the surface of the bulging portion 38 including the inclined surface 40, in particular, the operation of attaching the end portion 2202 of the inner liner 22 to the flat surface 3804 of the bulging portion 38 orthogonal to the internal threads 36 becomes easier, which is advantageous in increasing the production efficiency of the aircraft water tank 10 and reducing costs.

In the present embodiment, the embodiment in which the joining portion of the mouthpiece is formed by the internal threads 36 and the joining portion of the lid is formed by the external threads 50 has been described. However, it is needless to say that the present technology is applicable to an embodiment in which the joining portion of the mouthpiece is formed by external threads, the joining portion of the lid is formed by internal threads, and the tubular portion 30 is covered with the lid 34.

The invention claimed is:
1. An aircraft water tank, comprising:
a tank body having an inner surface formed of an inner liner;
an annular mouthpiece attached to the tank body;
an opening portion provided inside the mouthpiece; and
a lid detachably joined to the mouthpiece by external threads formed on the lid,
wherein
the opening portion is opened and sealed by the lid,
the mouthpiece has a tubular portion to which the lid is joined,
the tubular portion has a bulging portion provided on an inner peripheral portion of the tubular portion, the bulging portion bulging inward in a radial direction of the tubular portion,
the inner liner is attached to a surface of the bulging portion,
a seal member is provided between a portion of the lid located inside the tubular portion and a portion of the inner liner attached to the surface of the bulging portion,
in a state where the lid is joined to the tubular portion, compression of the seal member seals the opening portion liquid-tightly to form a sealed water storage space in the tank body,
an end of the inner liner attached to the surface of the bulging portion is located outside the water storage space,
the bulging portion is provided at a position on the inner peripheral portion of the tubular portion adjacent to the tank body in an axial direction of the tubular portion,
a joining portion of the mouthpiece to which the lid is joined is provided at a position on the inner peripheral portion of the tubular portion remote from the tank body in the axial direction of the tubular portion, the joining portion of the mouthpiece having internal threads at a position on an inner peripheral portion of the tubular portion, the internal threads being engageable with the external threads of the lid,
the bulging portion is provided protruding inward in the radial direction from an inner diameter of the joining portion of the mouthpiece,
a groove having an inner peripheral surface whose diameter is larger than a major diameter of the internal threads of the joining portion of the mouthpiece is formed at a boundary between the joining portion of the mouthpiece and the bulging portion on the inner peripheral portion of the tubular portion,
the bulging portion has an inclined surface inwardly inclined in the radial direction of the tubular portion toward the tank body in the axial direction of the tubular portion,
the end of the inner liner is attached to an end of the inclined surface of the bulging portion, the end of the inner liner communicating with the groove through the surface of the bulging portion,
the inner liner at the inclined surface of the bulging portion forms an inclined inner liner surface at which the seal member is compressed, and
the end of the inner liner terminates radially inwardly of a radially innermost portion of the internal threads.

2. The aircraft water tank according to claim 1, wherein the lid includes an annular plate portion having a joining portion formed on an outer peripheral surface thereof, the joining portion being configured to be joined to the joining portion of the mouthpiece,
a tube portion protruding from an inner peripheral portion of one end surface in a thickness direction of the annular plate portion, and an end surface portion connecting a tip of the tube portion, and the portion of the lid configured to compress the seal member is a corner portion formed by the end surface of the annular plate portion and the outer peripheral surface of the tube portion, and the portion of the inner liner configured to compress the seal member is a portion of the inner liner attached to the inclined surface.

3. The aircraft water tank according to claim 2, wherein the seal member is mounted at a position on the outer peripheral surface of the tube portion adjacent to the end surface.

4. The aircraft water tank according to claim 1, wherein the bulging portion has a surface facing a space inside the joining portion of the mouthpiece at a position adjacent to the joining portion of the mouthpiece in the axial direction of the tubular portion, and the end of the inner liner is located at a position on the surface located inside in the radial direction of the inner diameter of the joining portion of the mouthpiece.

5. The aircraft water tank according to claim 2, wherein the bulging portion has a surface facing a space inside the joining portion of the mouthpiece at a position adjacent to the joining portion of the mouthpiece in the axial direction of the tubular portion, and the end of the inner liner is located at a position on the surface located inside in the radial direction of the inner diameter of the joining portion of the mouthpiece.

6. The aircraft water tank according to claim 3, wherein the bulging portion has a surface facing a space inside the joining portion of the mouthpiece at a position adjacent to the joining portion of the mouthpiece in the axial direction of the tubular portion, and the end of the inner liner is located at a position on the surface located inside in the radial direction of the inner diameter of the joining portion of the mouthpiece.

\* \* \* \* \*